United States Patent [19]

Shimizu et al.

[11] Patent Number: 5,757,958
[45] Date of Patent: May 26, 1998

[54] DOCUMENT RECOGNIZING SYSTEM AND METHOD

[75] Inventors: Noboru Shimizu; Katsuhiko Itonori; Norio Yamamoto, all of Kanagawa, Japan

[73] Assignee: Fuji Xerox Co., Ltd., Tokyo, Japan

[21] Appl. No.: 462,025

[22] Filed: Jun. 5, 1995

Related U.S. Application Data

[62] Division of Ser. No. 417,142, Apr. 4, 1995, abandoned, Continuation of Ser. No. 1,558, Jan. 6, 1993, abandoned.

[30] Foreign Application Priority Data

Jan. 9, 1992 [JP] Japan ................................. 4-19402

[51] Int. Cl.⁶ ................................................ G06K 9/00
[52] U.S. Cl. .................... 382/181; 382/305; 358/402; 358/403
[58] Field of Search ...................... 382/181, 185, 382/186, 187, 276, 305, 306, 137, 138, 139, 140; 358/402, 403, 404

[56] References Cited

U.S. PATENT DOCUMENTS

| | | |
|---|---|---|
| 4,180,798 | 12/1979 | Komori et al. ............ 382/181 |
| 4,665,555 | 5/1987 | Alker et al. ............... 382/305 |
| 5,054,096 | 10/1991 | Beizer ....................... 382/298 |
| 5,057,935 | 10/1991 | Williams .................... 358/402 |
| 5,283,665 | 2/1994 | Ogata ......................... 358/402 |

FOREIGN PATENT DOCUMENTS

| | | |
|---|---|---|
| 63-155385 | 6/1988 | Japan . |
| 1-180081 | 7/1989 | Japan . |
| 1-183795 | 7/1989 | Japan . |

*Primary Examiner*—Leo Boudreau
*Assistant Examiner*—Phuoc Tran
*Attorney, Agent, or Firm*—Finnegan, Henderson, Farabow, Garrett & Dunner, L.L.P.

[57] ABSTRACT

A document recognizing system in which a document-forming work station coupled with a scanner, a file station for storing image data, and a recognition work station for recognizing a document image are interconnected through a network. In the document recognizing system, the character image data entered from the scanner is transferred to the file station through the document-forming work station, and the recognition result of the character image data by the recognition work station is also transferred to the file station and stored therein, allowing the operator to read out a necessary recognition result at the time of forming a desired document in the document-forming work station.

3 Claims, 9 Drawing Sheets

FIG. 1
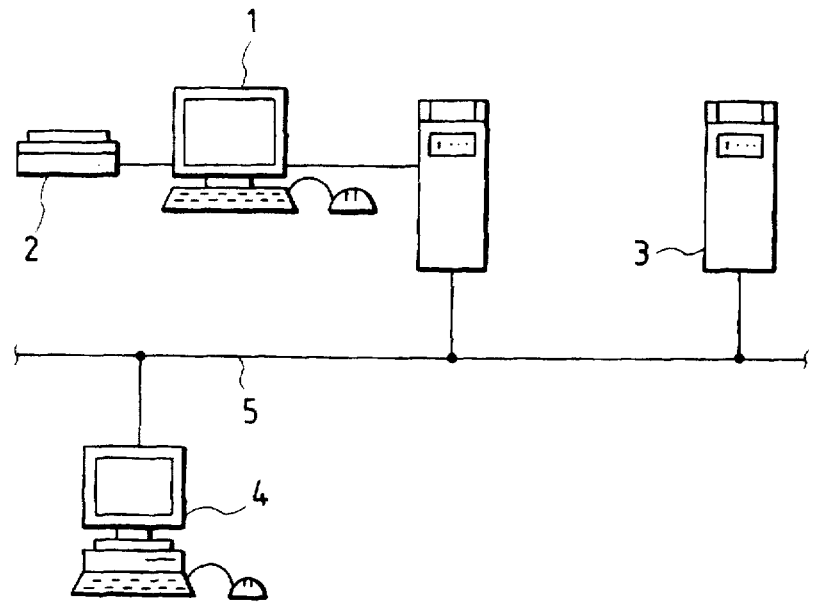
FIG. 3
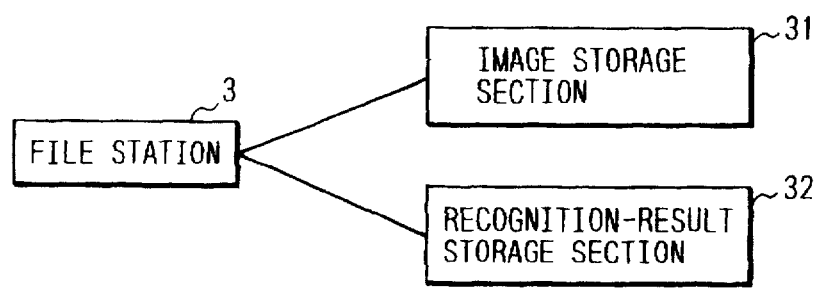
FIG. 4
| Dec | 26 | 19:50 | Itonori |
|-----|----|-------|---------|
| Jan | 10 | 21:05 | NYamatomi |
| Jan | 11 | 09:36 | NShimizu |

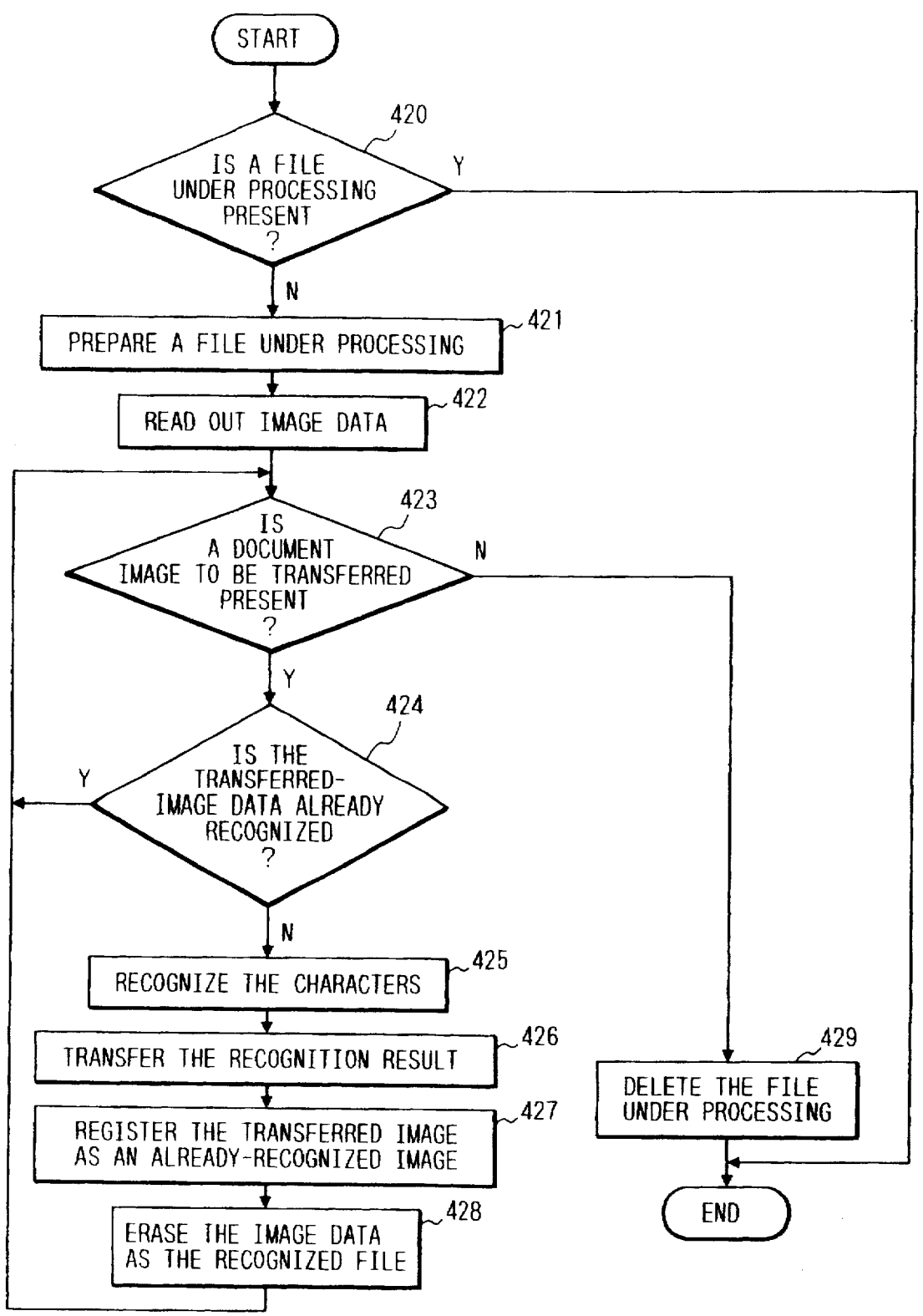

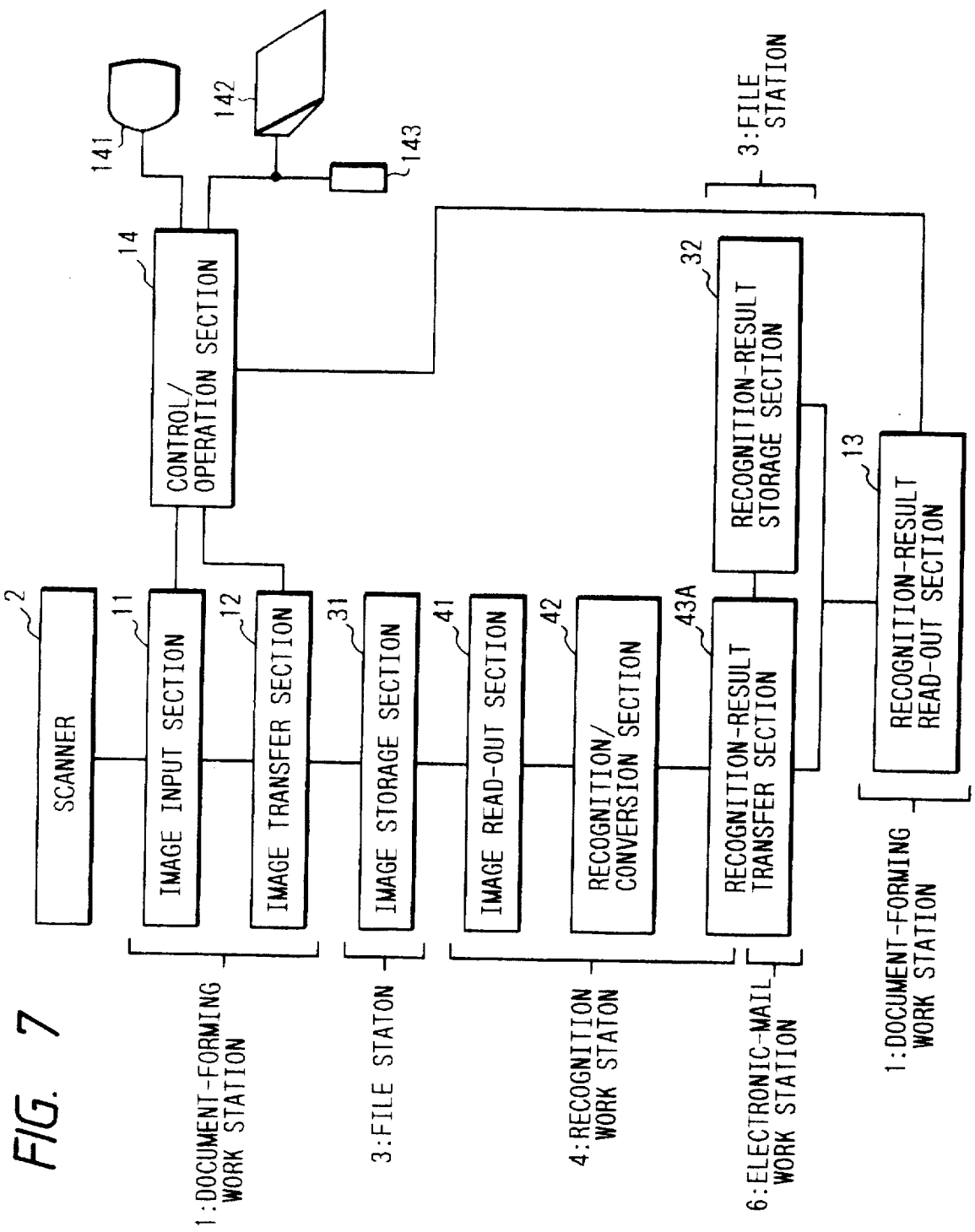

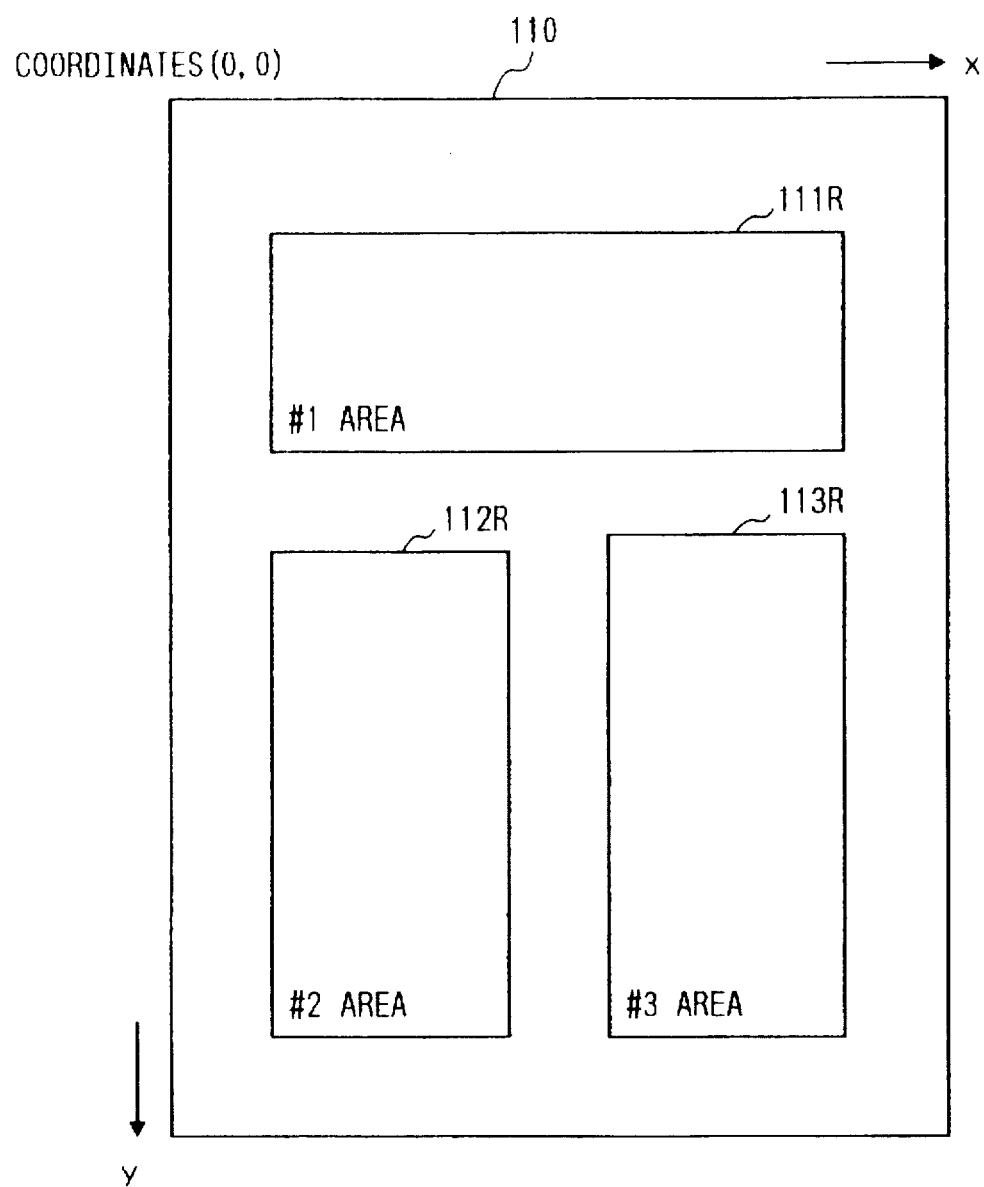

DOCUMENT RECOGNIZING SYSTEM AND METHOD

This is a division of application Ser. No. 08/417,142, filed Apr. 4, 1995, abandoned, which is a continuation of Ser. No. 08/001,558 filed Jan. 6, 1993, now abandoned.

BACKGROUND OF THE INVENTION

1. Field of the Invention

The present invention relates to a network-basis document recognizing system for recognizing image information or data, such as characters and graphic patterns, printed on a paper document, and a document recognizing method.

2. Discussion of the Related Art

There have been many studies and proposals on the document recognizing system, which recognizes characters and graphic patterns printed on a sheet of paper, and inputs those items of data to a document editing device, for example, a word processor.

Examples of such a conventional system are cited in the following publications, that is, Japanese Patent Unexamined Publication Nos. Sho. 63-155385, Hei. 1-183795 and Hei. 1-180081. In these publications, each document recognition system is made up of a scanner for reading visual information on a document in the form of image data, a character recognizing device for recognizing characters of the image data, and a display/editing device for displaying and editing the image data on the basis of the recognition result. Another character recognizing device is described on page 482 of "IMAGE PROCESSING HANDBOOK" (1st edition, 2nd print) edited by Image Processing Handbook Editing Committee (chairman: Morio Ogami), published on Feb. 28, 1988 by Shokodo Co., Ltd. in Japan. This character recognizing device is basically the same as those disclosed in the above publications, when considering them from a viewpoint of the character recognition.

The document recognizing systems thus constructed suffer from the following problems.

(1) Document data read by the scanner is input in the form of image data to the document recognizing system. To store the image data, a memory device of a large memory capacity is required. In other words, to input much document data to one conventional document recognizing system, a memory device of a large memory capacity must be prepared.

(2) The scanner must be used for each work station. The combination of the scanner and the work station leads to an increase of the cost.

(3) For character recognition, a great amount of data must be processed. Where a process for character recognition is described in software, during the character recognition process, another process must be interrupted or the priority level of it must be lowered. Accordingly, the data process is inefficient in the prior system.

(4) Where the character recognizing process is realized by hardware, the cost to manufacture the hardware is high, and the resultant system also is expensive.

(5) To well operate the prior document recognizing system, an operator must gain knowledge and skill. In other words, it is difficult for a beginner to operate the system.

SUMMARY OF THE INVENTION

The present invention has been made in view of the above circumstances and has an object to provide a document recognizing system including of a plurality of work stations interconnected through a network, in which image data are all stored into a memory device of a large memory capacity in a file station, and hence there is no need of providing a memory device of a large memory capacity in each work station.

Another object of the invention is to provide a document recognizing system including a plurality of work stations interconnected through a network, in which one work station (actually operated by an operator) with a scanner is exclusively used for entering document image, and hence there is no need of using the expensive scanner for each work station, thereby reducing the cost of the system.

An additional object of the invention is to provide a document recognizing system including of a plurality of work stations interconnected through a network, in which one work station has the function of character recognition, and an operator can operate another work station having no character recognition function, independently of the character recognition process, thereby enabling even a beginner to operate the system.

To achieve the above objects, the invention provides a recognizing system including: at least one first data processing device including memory means and coupled with image input means for inputting image data, the memory means storing image data entered by the image input means; a second data processing device including conversion means for reading the image data out of the memory means to convert the image data into code data; and a network for connecting the first data processing device with the second data processing device.

BRIEF DESCRIPTION OF THE DRAWINGS

The accompanying drawings, which are incorporated in and constitute a part of this specification, illustrate embodiments of the invention and, together with the description, serve to explain the objects, advantages and principles of the invention. In the drawings, FIG. 1 is a schematic diagram showing a network-basis document recognizing system according to a first embodiment of the present invention;

FIG. 3 is a functional block diagram for functionally explaining the memory device in the file station in the first embodiment;

FIG. 4 is a table showing a list of registered, already-recognized files in the first embodiment;

FIG. 5 is a flow chart showing procedural steps of the recognition process in the first embodiment;

FIG. 7 is a functional block diagram useful in functionally explaining a recognition process in the second embodiment;

FIG. 13 is a diagram for explaining the order of transferring three image areas enclosed by rectangular frames that are displayed on a display screen.

DETAILED DESCRIPTION OF THE PREFERRED EMBODIMENTS

Figure 2:
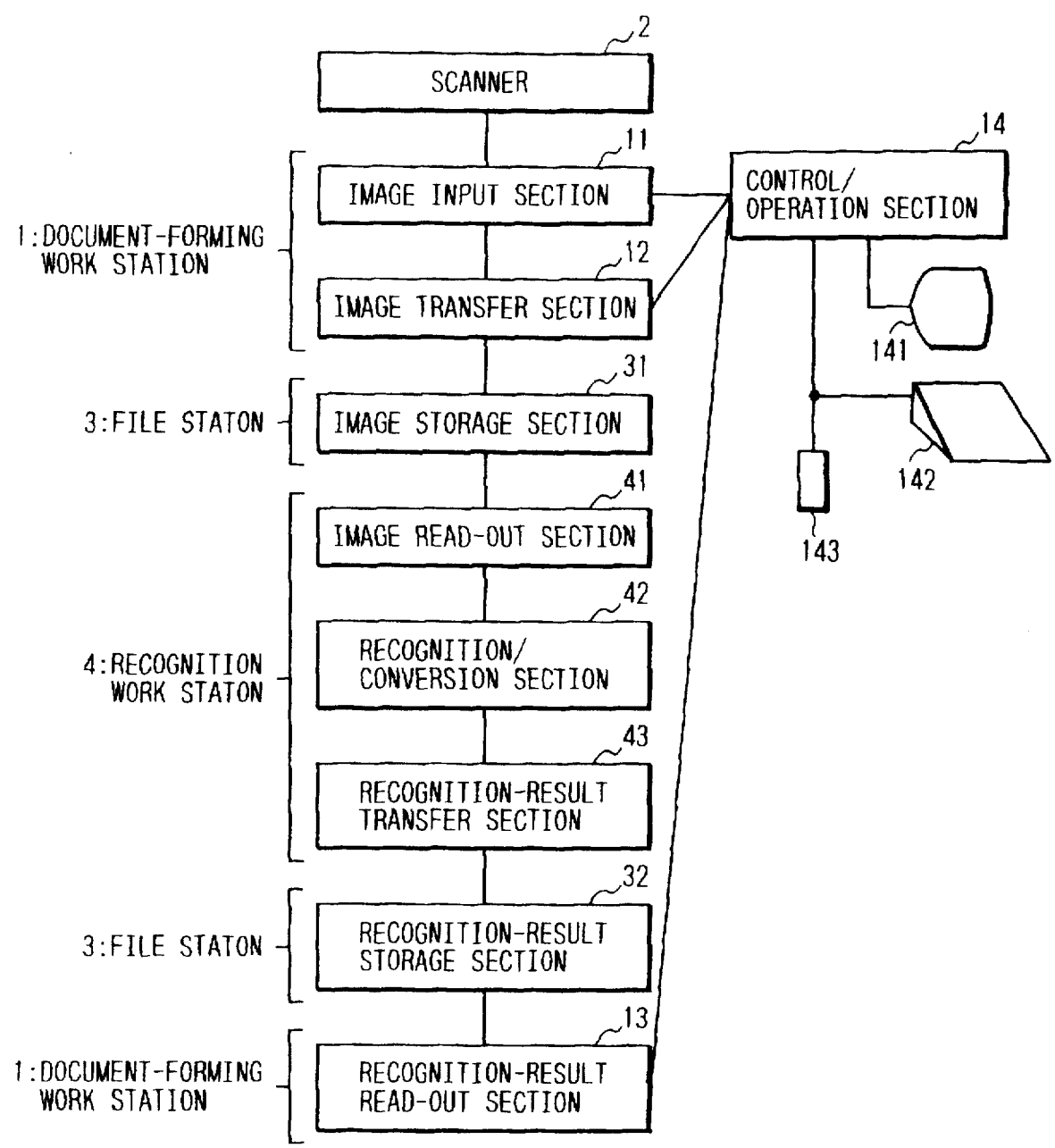
FIG. 2 is a functional block diagram useful in functionally explaining a recognition process in the first embodiment.

FIG. 1 is a schematic diagram showing a network-basis document recognizing system according to a first embodiment of the present invention.

As shown, the document recognizing system includes a document-forming work station 1 directly operated for document preparation by an operator, a scanner 2 connected to only the document-forming work station 1, a file station 3 including a memory device (not shown) of a large memory capacity, and a recognition work station 4 for recognizing document image data stored in the memory device of the file station 3. Those stations are interconnected through a network 5.

FIG. 2 is a functional block diagram useful in functionally explaining a recognition process in the first embodiment. FIG. 3 is a functional block diagram for functionally explaining the memory device in the file station 3 in the first embodiment. FIG. 4 is a table showing a list of registered, already-recognized files in the first embodiment. FIG. 5 is a flow chart showing procedural steps of the recognition process in the first embodiment.

The first embodiment of the document recognizing system according to the present invention will be described with reference to FIGS. 1 through 5.

An operator, who operates the document-forming work station 1, executes the process in an image input section 11, to operate the scanner 2 exclusively provided for the work station, so that the document data on a proper recording medium, such as a sheet of paper is digitally entered to the work station in the form of image data. The image data, which correspond to the document formation, is temporarily stored in a memory device (not shown) in the document-forming work station 1. In this case, if necessary, the image as an object to be recognized is displayed on the screen of a display device 141 by operating a control/operation section 14 in the document-forming work station 1. The operator checks whether or not the image is an intended image and whether or not an image quality of the image is proper. After the check, the image data is input again to the work station.

In an image transfer section 12 in the document-forming work station 1, the document image as the object to be recognized that is entered from the scanner 2 is transferred to an image storage section 31 in the file station 3, by way of the network 5. A memory device of a prescribed memory capacity in the file station 3, as shown in FIG. 3, is segmented in a memory area into the image storage section 31 for storing the recognized document image and a recognition-result storage section 32 for storing the results of recognition. Those storage sections are selectively used according to the type of the data received. Specific operations, that are done by the operator of the document-forming work station 1, follow. It is assumed now that the document image information as an object to be recognized is displayed as an icon on the screen of the display device 141. The operator selects the icon by using an input device 142, e.g., a keyboard, or a pointing device 143, e.g., a mouse. The icon of the selected document image is transferred to the image storage section 31 displayed also as an icon on the screen of the display device 141. In this way, a document image as an intended object to be recognized can be transferred to the image storage section 31 in the file station 3. The instructions by the operator are transferred to the image transfer section 12 through the control/operation section 14.

Thereafter, the document image as the recognized object, that has been transferred to and stored in the image storage section 31 of the memory device in the file station 3, is recognized by the recognition work station 4. A sequence of steps of the recognizing process by the recognition work station may be depicted as shown in a flow chart shown in FIG. 5. In this instance of the embodiment, the recognition process is periodically started at a preset time, e.g., at the beginning of each hour. The start time and the number of operations may be selected and set as desired. If an instruction to start a prescribed recognition process is issued, a control system in the recognition work station checks whether or not a recognition process file as a file under recognition is present (step 420). The reason why step 420 is needed will be given. As described above, the recognition process in this instance starts at a preset time (e.g., at the beginning of each hour). Where the recognition process for one object to be recognized takes much time (of more than one hour, for example), the next recognition process will start before the old recognition process ends. In this case, the double recognition processes concurrently proceed for one object to be recognized. That is, one of the recognition processes is unnecessary. It is for this reason that step 420 is provided. With provision of the step, if a file under recognition is present (the check result is Y), an instruction to terminate the recognition process is issued, thereby eliminating this useless concurrent proceeding of the recognition processes. In step 420, if a file under recognition is absent (the check result is N), the file under recognition is prepared in step 421. Subsequently, an image read-out section 41 in the recognition work station 4 (FIG. 2) operates to read the data corresponding to document images, which are all the objects to be recognized, from the image storage section 31 in the memory device in the file station 3, through the network 5, and writes the readout image data into a memory device (not shown) in the recognition work station 4 (step 422).

In this instance, the document images to be transferred are recognized one by one in a successive order. To this end, the control system checks if a document image to be transferred is present (step 423). If it is present (the check result is Y), the control checks, in the next step 424, if the document image has been recognized. The check is made in the following way. As in step 427 for register, at the instant that the recognition process for an object to recognized ends, the file name of the transferred document image and the date of forming the document image (the date when the document is read by the scanner) are registered in the corresponding registered file already recognized (shown in FIG. 4). Referring to FIG. 4, Itonori (NYamamoto and NShimizu) has been registered as the file name of the document image. Dec 26 19 : 50 (Jan 10 19 : 50 and Jan 11 09 : 36) is the date of document image preparation. When the already-recognized file name and the date are the same as those previously registered in the registered, already-recognized file, the control determines that the document data has been registered (the check result is Y), and returns to step 423. The reason why the registered, already-recognized file name and its preparation date are used as the items to be compared, follows. In a case where there are two files of document images having different contents, sometimes the same file names are assigned to those different document images. If these two document images are compared on only the names of the registered, already-recognized files, those are excluded from the items to be compared. To avoid this problematic situation, the file preparation date is enlisted in the items to be compared, in addition to the registered, already-recognized file name. If the check result in step 424 shows that the transferred document image is not yet recognized, in the next step 425 a recognition/conversion section 42 in the recognition work station 4 executes a prescribed recognition process, and converts and generates prescribed code data corresponding to the recognition result. In step 425 for recognition, the control extracts a character area from the object to be recognized and recognizes the characters therein. Here, the way of the character recognition is not limited. Subsequently, a recognition-result transfer section 43 in the recognition work station 4 transfers the prescribed code data resulting from the character recognition, to the recognition-result storage section 32 in the file station 3, through the network 5 (step 426). In subsequent step 427, as already referred to, the file name of the document image data file as the object to be recognized and its preparation date are registered in the registered, already-recognized file. Then, the document image data as the recognized file thus registered is erased (step 428).

The above sequence of procedural steps is repeatedly continued till as the transferred images as the objects to be recognized are processed to nothing. When all the transferred images are completely processed (the result of the processing in step 423 is N), the control deletes the file under process (step 429) and is ready for a new recognition process.

When a proper time elapses after the image to be recognized is transferred to the memory device in the file station 3, the operator searches the recognition-result storage section 32 within the memory device in the file station 3, to check if a desired recognition result is stored therein. If it is stored, a recognition-result read-out section 13 in the document-forming work station 1 reads out the desired recognition result and uses it for document preparation.

While the first embodiment of the present invention has been described in detail, it should be understood that the embodiment may be variously changed, modified and altered within the scope of the invention as follows:

1) In the document recognizing system of the first embodiment, the number of each of the document-forming work station with the scanner, the file station with the memory device of a large memory capacity, and the recognition work station, which are connected to the network, is one. If required, the number of each of them may be two or more. Alternatively, one station may have different functions.

2) In the first embodiment, the operation of reading image data and the operation of in putting the recognition result into the recognition system are carried out by one work station, or the document-forming work station. If necessary, another work station may be used for carrying out those operations. For example, a work station exclusively used for inputting image data may be connected to the network and operated by all related operators. The recognition result can be used in the work stations assigned to the operators.

3) In the first embodiment, the memory device in the file station 3 is divided into the image storage section 31 and the recognition-result storage section 32. The memory device, not divided, may be used for storing both the document images and the results of recognizing them. In this case, the image after undergone the recognition process may be erased.

4) As recalled, in the first embodiment, the data relating to the document image as the object to be recognized is entered directly from the scanner. Alternatively, the document images may be stored into a recording medium, such as an optical disk file, and after that when an operator desires to use a document image of those stored, he retrieves it and enters it into the document recognizing system.

5) In the first embodiment, the character recognition is used, by way of example, for the recognition process. The document recognizing system may have additional functions, such as a raster/vector transforming function for transforming a graphic area to be recognized to corresponding vector data, a graphic pattern recognition function for recognizing the graphic area as basic graphic patterns, e.g., a triangle and a square, and a document recognition function for recognizing documents in which characters and graphic patterns exist together.

Figure 6:
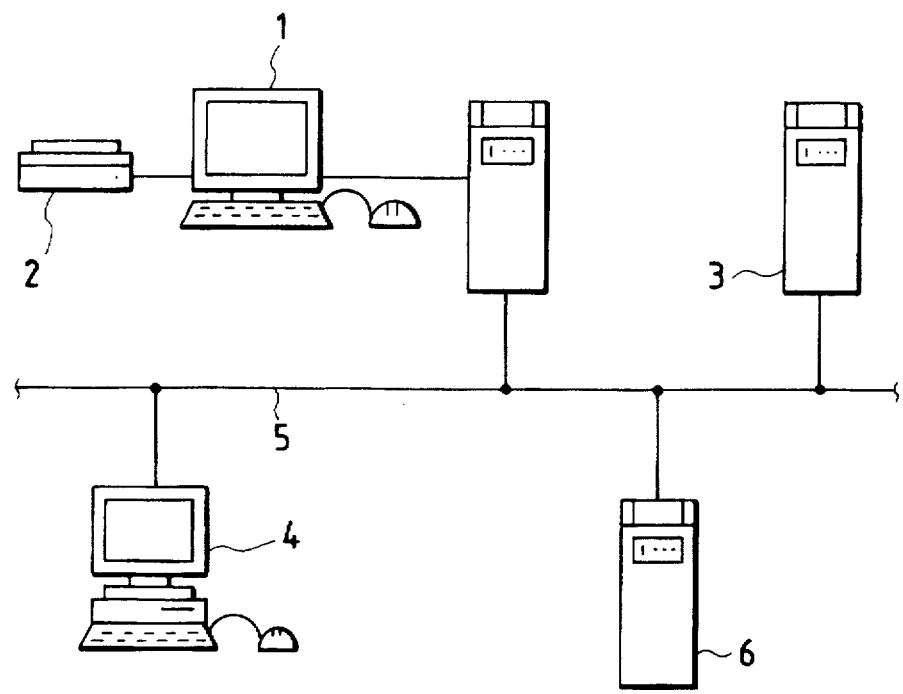
FIG. 6 is a schematic diagram showing a network-basis document recognizing system according to a second embodiment of the present invention.

FIG. 6 is a schematic diagram showing a network-basis document recognizing system according to a second embodiment of the present invention. As shown, the document recognizing system includes a document-forming work station 1 directly operated for document preparation by an operator, a scanner 2 connected to only the document-forming work station 1, a file station 3 provided with a memory device (not shown) of a large memory capacity, a recognition work station 4 for recognizing document image data stored in the memory device of the file station 3, and an electronic-mail work station 6, which responds to given commands to transmit electronic data to a specified destination. Those stations are interconnected through a network 5.

Figure 8:
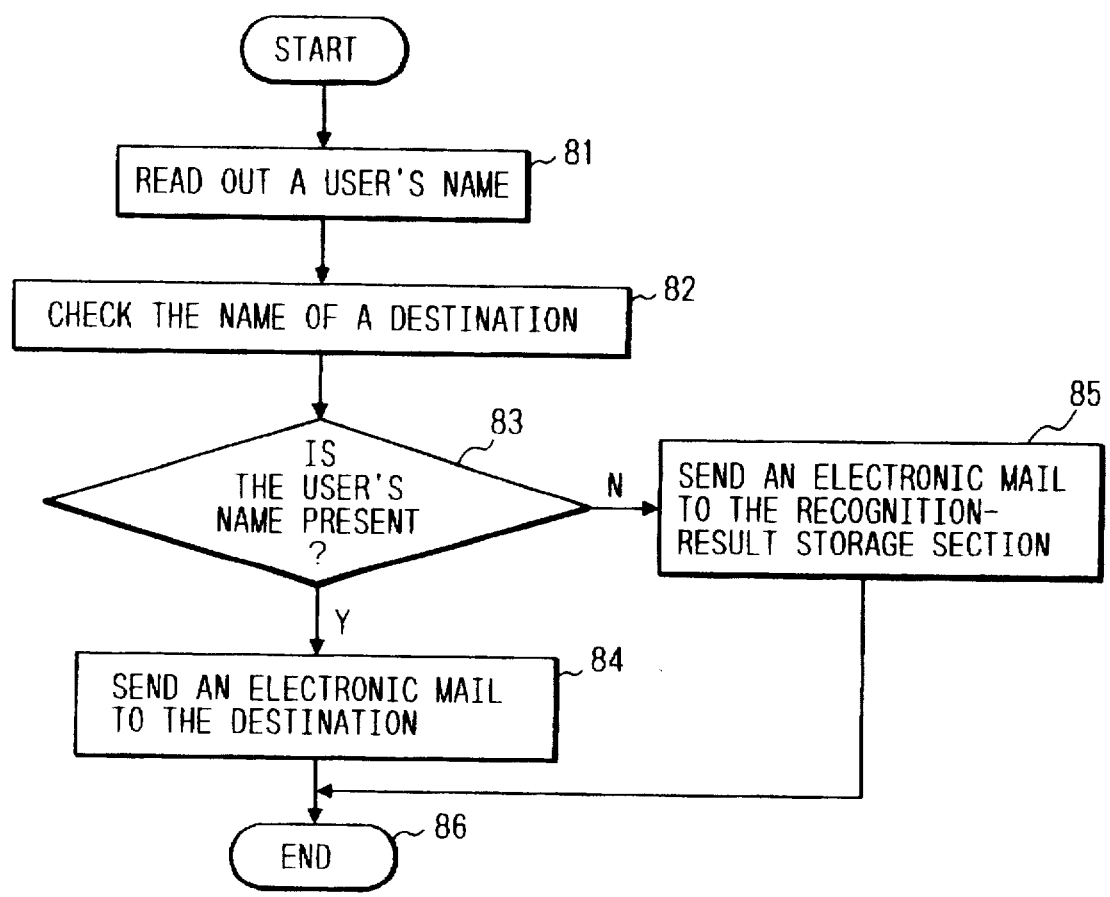
FIG. 8 is a flow chart showing procedural steps of the operation of an electronic-mail work station in the second embodiment.

FIG. 7 is a functional block diagram useful in functionally explaining a recognition process in the second embodiment. FIG. 8 is a flow chart showing procedural steps of the operation of the electronic-mail work station 6 in the second embodiment. The memory device in the file station 3 in the second embodiment is functionally the same as in the first embodiment. Accordingly, in the description of the second embodiment to follow, FIG. 3 will be referred to if necessary. The registered, already-recognized file of the second embodiment also resembles that in the first embodiment, and hence FIG. 4 will be referred to where it is necessary. Further, the same thing is true for the recognition process of the second embodiment, and then FIG. 5 showing the flow chart will be referred to.

The document recognizing system according to the second embodiment of the present invention will be described with reference to FIGS. 6 through 8, and FIGS. 3 through 5.

An operator, who operates the document-forming work station 1, executes the process in an image input section 11, to operate the scanner 2 exclusively provided for the work station, and to digitally enter the document information on a proper recording medium, such as a sheet of paper, in the form of image data to the work station. The image data, which correspond to the document formation, is temporarily stored in a memory device (not shown) in the document-forming work station 1. In this case, if necessary, the image as an object to be recognized is displayed on the screen of a display device 141 by operating a control/operation section 14 in the document-forming work station 1. The operator checks whether or not the image is an intended image and whether or not an image quality of the image is proper. After the check, the image data is input again to the work station.

In an image transfer section 12 in the document-forming work station 1, the document image as the object to be recognized that is entered from the scanner 2 is transferred to an image storage section 31 in the file station 3, through the network 5. A memory device of a prescribed memory capacity in the file station 3, as shown in FIG. 3, is segmented into the image storage section 31 for storing the recognized document image and a recognition-result storage section 32 for storing the results of recognition. Those storage sections are selectively used according to the type of the data received. The recognition-result storage section 32 functions to store the recognition result when its transfer fails. Specific operations, that are done by the operator of the document-forming work station 1, follow. It is assumed now that information on the document image as an object to be recognized is displayed as an icon on the screen of the display device 141. The operator selects the icon by using an input device 142, e.g., a keyboard, or a pointing device 143, e.g., a mouse. The icon of the selected document image is transferred to the image storage section 31 displayed also as an icon on the screen of the display device 141. In this way, a document image as an intended object to be recognized can be transferred to the image storage section 31 in the file station 3. The instructions by the operator are transferred to the image transfer section 12 through the control/operation section 14.

Thereafter, the document image as the recognized object, that has been transferred to and stored in the image storage section 31 of the memory device in the file station 3, is recognized by the recognition work station 4. A sequence of steps of the recognizing process by the recognition work station will be described referring to a flow chart shown in FIG. 5. In this instance of the embodiment, the recognition process is periodically started at a preset time, e.g., at the beginning of each hour. The start time and the number of operations may be selected and set as desired. If an instruction to start a prescribed recognition process is issued, the control system in the recognition work station checks whether or not a recognition process file as a file under recognition is present (step 420). The reason why step 420 is needed will be given. As described above, the recognition process in this instance starts at a preset time (e.g., at the beginning of each hour). Where the recognition process for one object to be recognized takes much time (of more than one hour, for example), the next recognition process probably starts before the old recognition process ends. In this case, the double recognition processes concurrently proceed for one object to be recognized. That is, one of the recognition processes is unnecessary. It is for this reason that step 420 is provided. With provision of the step, if a file under recognition is present (the check result is Y), an instruction to terminate the recognition process is issued, thereby eliminating this useless concurrent proceeding of the recognition processes. In step 420, if a file under recognition is absent (the check result is N), a file under recognition is prepared in step 421. Subsequently, an image read-out section 41 in the recognition work station 4 operates to read the data corresponding to document images, which are all the objects to be recognized, from the image storage section 31 in the memory device in the file station 3, through the network 5, and writes the readout image data into a memory device (not shown) in the recognition work station 4 (step 422).

In this instance, the document images to be transferred are recognized one by one in a successive order. To this end, the control system checks if a document image to be transferred is present (step 423). If it is present (the check result is Y), the control checks, in the next step 424, if the document image has been recognized. The check is made in the following way. As in step 427 for register, at the instant that the recognition process for an object to recognized ends, the file name of the transferred document image and the date of preparing the document image (the date when the document is read by the scanner) are registered in the corresponding registered file already recognized (shown in FIG. 4). When the already-recognized file name and the date are the same as those previously registered in the registered, already-recognized file, the control determines that the document data has been registered (the check result is Y), and returns to step 423. The reason why the registered, already-recognized file name and its preparation date are used as the items to be compared, is as already stated. Then, no further description on the reason will be given here. If the check result in step 424 shows that the transferred document image is not yet recognized, in next step 425 a recognition/ conversion section 42 in the recognition work station 4 executes a prescribed recognition process, and converts and generates prescribed code data corresponding to the recognition result. In recognition step 425 for recognition, the control extracts a character area from the object to be recognized and recognizes the characters therein. Here, the way of the character recognition is not limited. Subsequently, a recognition-result transfer section 43A, which is provided in connection with both the recognition work station 4 and the electronic-mail work station 6, operates in the following way to transfer the prescribed code data resulting from the character recognition, to the document-forming work station 1 operated by a specific operator (step 426). The operation for the recognition result transfer will be described with reference to the flow chart shown in FIG. 8. When the recognition result transfer process starts to run in response to a trigger applied, the name of an operator (user) for the file name as the recognized object is picked up (step 81). In next step 82, the user name is confirmed as the name of a destination. Then, it is checked if the destination name is present (step 83). If the check result is yes (Y), an electronic mail is transmitted to the destination of such a name (step 84). If the check result is no (N), the electronic mail is transmitted to the recognition-result storage section 32 in the file station 3 (step 85). When such a process ends, the transfer process of the recognition result completely ends. The transfer process of the recognition result may also be explained as below. The recognition-result transfer section 43A picks up the user's name as an operator for the file name as the object to be recognized, and sends a command for the transmission of the file of the recognition result to the electronic-mail work station 6. When receiving the command from the recognition work station 4, the electronic-mail work station 6 sends the recognition result file to a specific one of the document-forming work stations 1 connected to the network 5. When the electronic-mail work station 6 fails to transmit the electronic mail owing to mistaken user's name, unknown destination (the user or work station to which the electronic mail is to be transmitted), and others, the electronic mail is transmitted to the recognition-result storage section 32 of the memory device in the file station 3. In step 427 (FIG. 5), as described above, the file name of the document image data file and the date of preparing the file are registered in the registered, already-recognition file. Then, the document image data as the recognized file thus registered is erased (step 428).

The above sequence of procedural steps is repeatedly continued till as the transferred images as the objects to be recognized are processed to nothing. When all the transferred images are completely processed (the result of the processing in step 423 is N), the control deletes the file under process (step 429) and is ready for a new recognition process.

When the image to be recognized is transferred to the memory device in the file station 3, the operator waits for arrival of the recognition result on the image to be recognized transmitted by electronic mail, while engaging in another work. If a desired electronic mail is received, a change indicative of arrival of the corresponding recognition result appears on the screen of the display section in the document-forming work station 1 which is operated by the operator. The change on the display screen is flashing of an icon, a change of the shape of the icon, or the like. Thus, in this instance of the embodiment, the arrival of a desired recognition result is visually presented to the operator. Accordingly, the operator can concentrate on his work being currently done, taking no notice of completion of a recognition process, till the desired recognition result arrives. After confirming the arrival of the desired recognition result, the recognition-result read-out section 13 in the document-forming work station 1 takes the desired recognition result from the icon representative of the electronic mail, and uses it for document preparation.

The second embodiment of the present invention thus far described may be modified or altered as below.

6) In the second embodiment, the result of recognizing the document information as the object to be recognized is transmitted to an operator by electronic mail. If necessary, it may be directly transmitted to a given memory area in a specific work station by making use of the file transfer function provided on the network.

Figure 9:
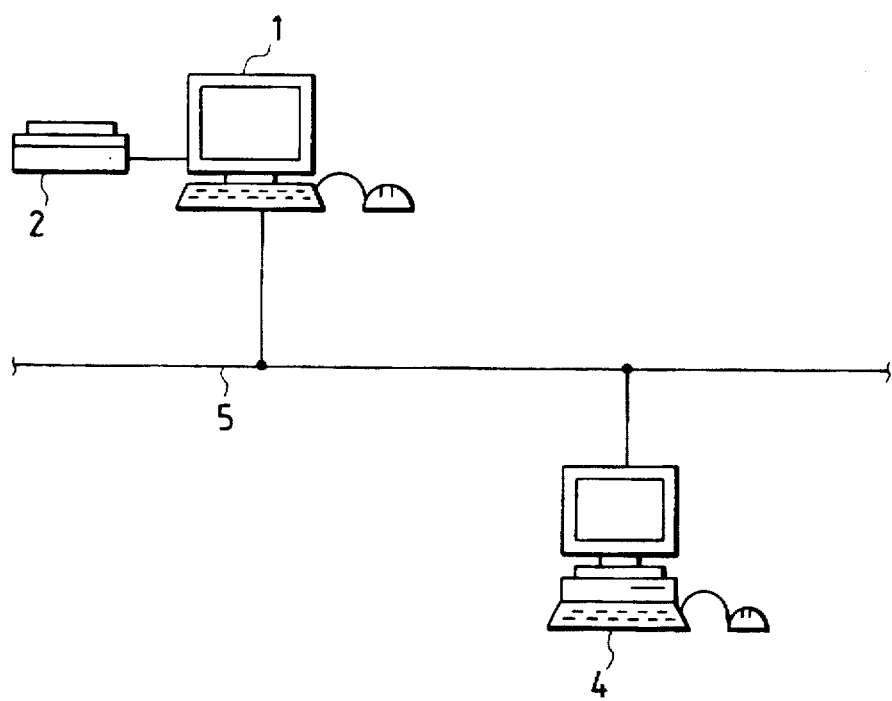
FIG. 9 is a schematic diagram showing a network-basis document recognizing system according to a third embodiment of the present invention.
Figure 10:
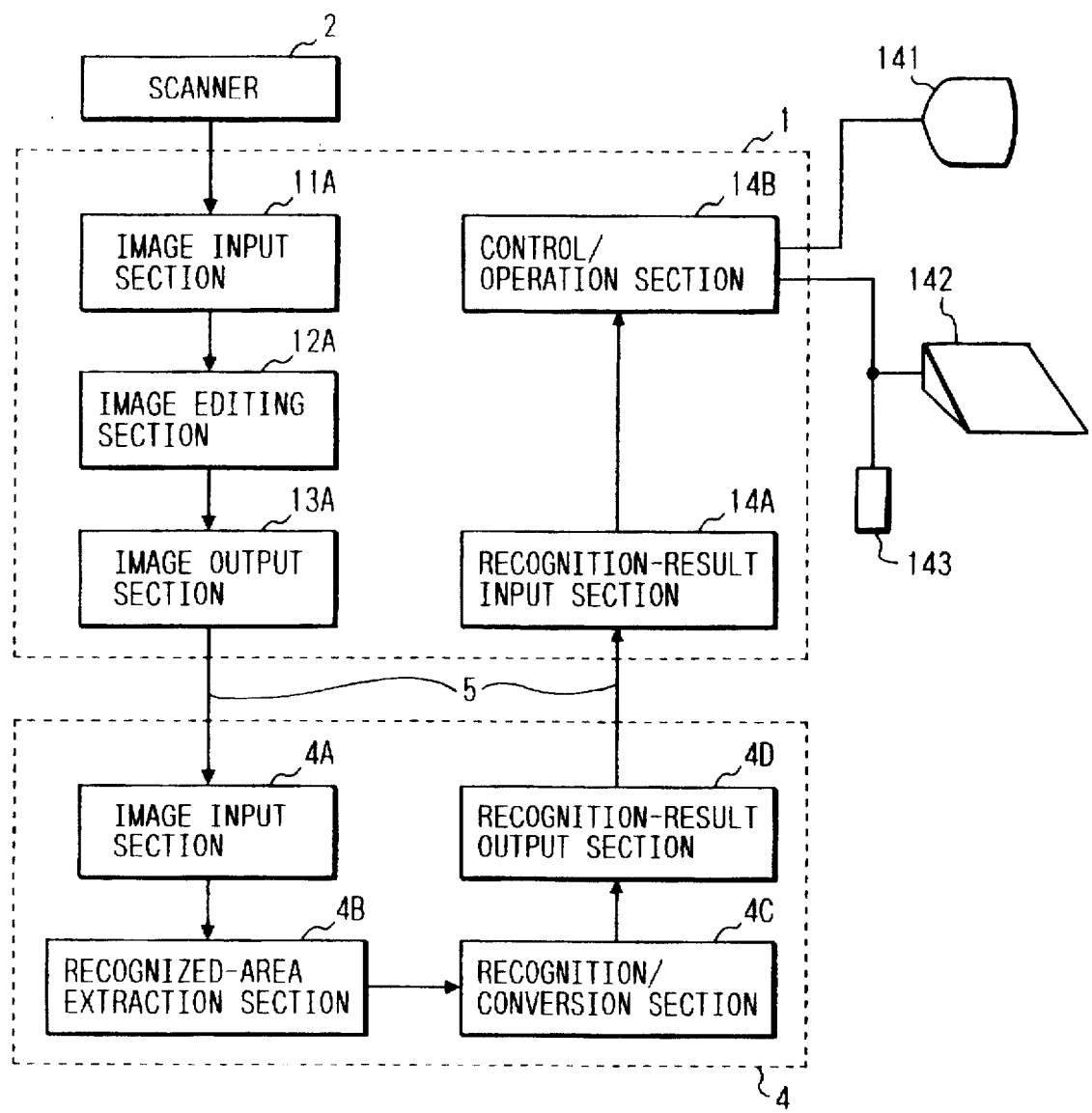
FIG. 10 is a functional block diagram useful in functionally explaining a recognition process in the third embodiment.

FIG. 9 is a schematic diagram showing a network-basis document recognizing system according to a third embodiment of the present invention. As shown, the document recognizing system includes a document-forming work station 1 including an image input section directly operated by an operator, a scanner 2 exclusively connected to the document-forming work station 1, and a recognition work station 4 including a recognition/conversion section 4C for recognizing the document image data from the document-forming work station 1 (and converting it into corresponding code data). Those stations are interconnected through a network 5. The document recognizing system of the third embodiment is improved over the first embodiment in that an image area to be recognized in a document image containing characters and graphic patterns in mixture can be readily specified without any special functional device for recognizing the character/graphic pattern document image. FIG. 10 is a functional block diagram useful in functionally explaining a recognition process in the third embodiment.

The document recognizing system according to the third embodiment of the present invention will be described with reference to FIGS. 9 and 10.

An operator, who operates the document-forming work station 1, operates the scanner 2 to execute the process by an image input section 11A, and to digitally enter the document information on a proper recording medium, such as a sheet of paper, in the form of image data to the work station. The image data thus input is displayed as an image to be recognized by a proper display device 141 under control of a control/operation section 14B in the document-forming work station 1.

Figure 11:
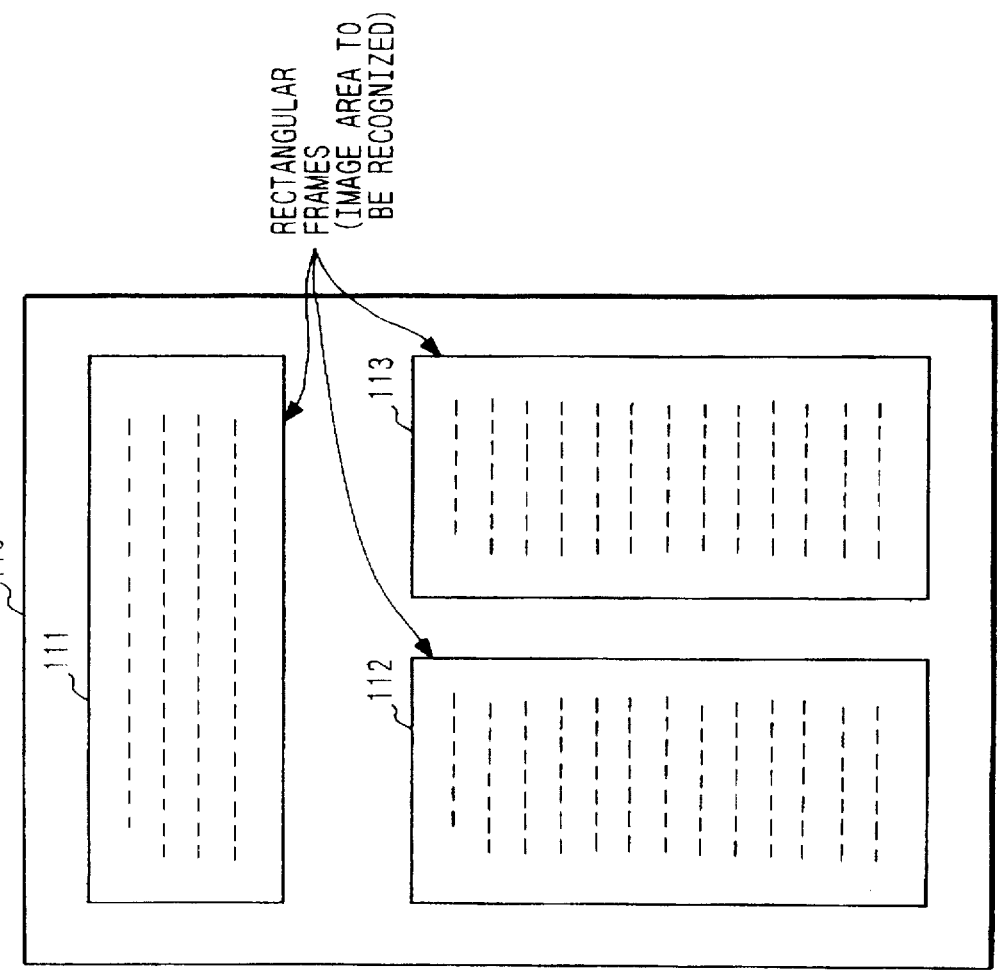
FIG. 11 is a diagram for explaining how image areas to be recognized in a document image are designated with rectangular frames in the third embodiment.

In an image editing section 12A in the document-forming work station 1, the operator interactively edits an image by using an input device 142, such as a keyboard or a pointing device 143, such as a mouse, thereby to designate an image area to be recognized. There are many methods to designate the image area to be recognized. In this case, it is essential that it is possible to distinguish an old image element from an image element added later on, or a new image element, in the stage of extracting the recognition area. The area designating method employed in this instance of the embodiment is a method in which the recognized image area is enclosed by a proper rectangular frame. The document frequently contains a rectangular frame. When such a rectangular frame is digitized by a scanner, for example, it sometimes suffers from noise, unwanted slant of lines, nonuniform thick of lines, and the like. As for the rectangular frame depicted in the image editing section 12A, the area to be recognized can be designated by a rectangular frame of which the line has a uniform width of one dot, for example. Further, the rectangular frame depicting function of the image editing section 12A is not the function specially provided for the document image recognition, but is originally provided in the document-forming work station 1. Referring to FIG. 11, there is shown an example of a document image in which regional image areas are enclosed by rectangular frames. In this instance, a document image display screen 110 contains a #1 frame 111, a #2 frame 112 and a #3 frame 113. The rectangular frame is designated by an operator in a manner that he points two diagonal vertices of a desired rectangular frame (for example, the left upper corner and the right lower corner of the rectangular) with a pointing device 143, while seeing the document image on the screen of the display device 141. The recognition area may be designated by indicating the two vertices with brackets "[ ]" or a plus sign "+", not by actually defining the rectangular frame. The image file of which the recognized area is designated is transferred to an image input section 4A in the recognition work station 4 by an image output section 13A in the document-forming work station 1. The document-forming work station 1, as described above, is connected through the network 5 to the recognition work station 4. Accordingly, the image file can be directly transferred to the image input section 4A by electronic mail or be transferred through a specific file station (not shown) to the same.

Figure 12:
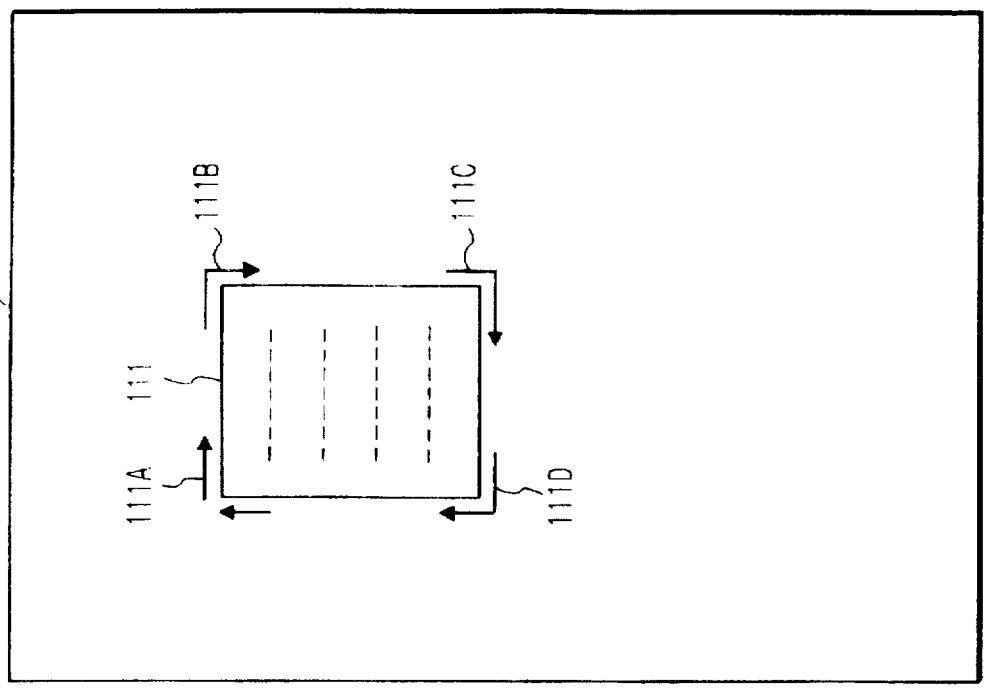
FIG. 12 is a diagram showing how an area enclosed by a rectangular frame with a given line width is recognized in the third embodiment.

The image file received by the image input section 4A is transferred to a recognized-area extracting section 4B. The recognized-area extracting section 4B extracts the recognized area indicated by the image editing section 12A of the document-forming work station 1. Referring to FIG. 12, there is shown an instance to recognize an area enclosed by a rectangular frame of which the line has a uniform line width of one dot. In FIG. 12, a document image display screen 110 is illustrated as in FIG. 11, and the #1 frame 111 alone is typically illustrated. The display screen 110 is scanned in a TV scanning manner, with a scan start point as the upper left corner. When during the scan the first pixel in the #1 frame 111 is encountered as roughly illustrated, the coordinate value at this point is stored. Subsequently, the next black pixel is traced through the leftward scan (the scan progression to the right along the top side of the #1 frame 111 in the drawing). From a point where the next pixel is a while pixel, the scan direction is turned downward (the scan progresses downward along the right side of the #1 frame 111) to trace a black pixel. The number of black pixels in the scan directions (in this instance, the number of black pixels in the rightward direction and the downward direction) are stored. From a point where the next pixel is a white pixel (a turning point of an arrow 111c), the scan progresses in the leftward direction (along the bottom side of the #1 frame 111). In the leftward scan, the number of black pixels equal to that of the black pixels known in the rightward scan could be traced. From the final turning point of an arrow 111D, black pixels are traced in the upward direction (along the left side of the #1 frame 111). Also in the upward scan, the number of black pixels equal to that of the black pixels known in the downward scan could be traced. If a white pixel is found during the trace of the known number of black pixels, which progresses along the bottom side and the left side of the #1 frame 111 meets a white pixel, it is considered that the rectangular frame being currently traced is not the intended one. As recalled, the line width of the rectangular frame is defined by one dot. If one or more black pixels adjacent to the line being traced are found during the black pixel tracing process, the rectangular frame being currently traced is not considered as the intended one. The system stops the tracing operation, and operates to extract the subsequent rectangular frame.

In the tracing process of the black pixels, the frame passes over a portion of the noise component of the original image, so that the line width of the frame is not uniform, or cannot be defined by one dot. One way to avoid this disadvantage is to allow presence of black pixels on both sides of the line of the frame that is scanned for tracing the black pixels if the pixels extend over a tolerable range of length. In this instance, an image area enclosed by the rectangular frame cannot be extremely small. Therefore, we can take the following approach that when the upper side of the frame that is first traced has a length less than a predetermined one, that frame is considered to be abnormal, and the subsequent trace is stopped. The approach is correspondingly applicable for the rectangular frame of the line width of two dots or more.

When a plurality of rectangular areas are picked up on the display screen displaying one document image, there is a case that a proper order of transferring those areas to the recognition/conversion section 4C must be determined. Referring to FIG. 13, there is illustrated a document image display screen 110 containing three rectangular areas; a #1 area 111R enclosed by a #1 frame, a #2 area 112R enclosed by a #2 frame, and a #3 area 113R enclosed by a #3 frame. In FIG. 13, the coordinates (0, 0) at the left upper corner on the display screen 110 is a starting point for tracing process. An arrow x indicates the horizontal tracing direction, and an arrow y, the vertical tracing direction. As seen, the lower side of the #1 area 111R is closer to the upper side of the #3 area 113R than the upper side of the #2 area 112R. Accordingly, those rectangular frames are extracted in the order of #1 area 111R, #3 area 113R, and #2 area 112R. An operator, who receives the recognition results of the those picked-up image areas, will prefer to the order of #1 area 111R, #2 area 112R and #3 area 113R when receiving the recognition results. Where the rectangular frames are arranged side by side as the frames #2 area 112R and the #3 area 113R (i.e., the y-coordinates of both frames overlay), the frame closer to the left side (of which the x-coordinate is smaller) is first sent to the recognition/conversion section 4C. The recognition/conversion section 4C picks up an intended character area from the rectangular area that was obtained in the recognized-area extracting section 4B, and converts the recognition result into character codes. The character recognition method used in this instance is not limited. The character codes of the character recognition result are transferred through the network 5 to a recognition-result input section 14A in the document-forming work station 1. An operator of the document-forming work station 1 uses the recognition result for document formation by operations on a control/operation section 14B.

It is evident that the document recognizing system according to the third embodiment of the present invention described above may be variously modified and altered within the scope of the invention. In the third embodiment, only two work stations, the document-forming work station 1 and the recognition work station 4, are connected to the network 5. If required, the file station 3 or the electronic-mail work station 6 may be additionally connected to the network.

As described above, in the network-basis recognizing system (for example, a document recognizing system) of the invention, document image information gathered by the scanner, which operated by an operator, is stored into the memory device of a large memory capacity in the file station 3 that can be accessed by other stations. Accordingly, there is no need of using a memory device of a large memory capacity for each document-forming station, which is provided for each operator. Provision of only one scanner for inputting document image information suffices for the document recognizing system of the invention. The process for recognizing the document image is executed in the recognition work station 4 of the document recognizing system. Accordingly, each document-forming work station is uninterruptively operable even when the recognition process proceeds. Further, there is no need of connecting a recognition hardware to the document-forming work station or installing a recognition software to the same. In other words, the document image can be satisfactorily recognized with only a conventional means or device, viz., not using any special hardware or software for document image recognition. Since the means or device the operator directly operates is familiar to him, he can skillfully manipulate the means or device for the document image recognition without any additional manipulation technique. In other words, even a beginner can easily and reliably operate the means or device for the document image recognition. The additional advantageous feature of the document recognizing system is that an operator of the document-forming work station can designate his desired image area. With this feature, even a document containing tables and graphic patterns and a document containing column settings can be processed as the objects to be recognized. The computer resource can be efficiently used by designating only the image area necessary for the recognition operation. This can be realized using the functions generally installed, viz., without provision of any special hardware or software for the document image recognition.

The foregoing description of preferred embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. A document image recognizing method in use with a document recognizing system in which a document-forming work station coupled with a scanner, a file station for storing image data, and a recognition work station for recognizing a document image are interconnected through a network, comprising the steps of:

checking by the recognition work station whether an image file for a document currently being processed is present;

designating for recognition, by an operator, an area of the document image represented by the image file;

executing a predetermined recognizing process on the basis of the checking result, the recognizing process including extracting the image area to be recognized from the document image and being performed only on the extracted area;

selecting a document image file as a candidate for an object to be recognized as a document image file to be actually recognized if a name of a document image file already recognized and a date of forming said document image file already recognized are respectively different from those of said document image file as a candidate for an object to be recognized; and transferring said document image file to be actually recognized into storage at a proper location in said file station.

2. A method of transferring a document-image recognition result in use with a document recognizing system in which a document-forming work station coupled with a scanner, a file station for storing document image data, a recognition work station for recognizing a document image, and an electronic-mail work station are interconnected through a network, said method comprising the steps of:

specifying a document-forming work station associated with an operator;

directly transferring a given document image file to a work area that can be used by the operator in the specified document-forming work station;

operating the specified work station to designate for recognition an area of a document image represented by the document image file;

extracting the image area to be recognized from the document image and performing an image recognition process only on the extracted area; and automatically transferring the completed recognition process result to the specified work station; and notifying the operator that the recognition result has been transferred.

3. The method according to claim 2, wherein the recognition result is transferred to the operator by an electronic mail.

* * * * *